United States Patent [19]

Franchina

[11] 4,291,833

[45] Sep. 29, 1981

[54] HEATING SYSTEM WITH FOCUSED SOLAR PANELS AND HEAT PUMP ASSIST

[75] Inventor: Anthonino A. Franchina, Sterling Heights, Mich.

[73] Assignee: Karl Wojcik, Warren, Mich. ; a part interest

[21] Appl. No.: 84,880

[22] Filed: Oct. 15, 1979

[51] Int. Cl.³ .......................................... G05D 23/00
[52] U.S. Cl. .................................. 237/2 B; 126/440; 126/427; 126/400
[58] Field of Search ............... 126/440, 400, 430, 427; 165/18, 29; 237/2 B; 62/324 E

[56] References Cited

U.S. PATENT DOCUMENTS

| | | | |
|---|---|---|---|
| 4,066,118 | 1/1978 | Goettl | 165/18 |
| 4,188,941 | 2/1980 | Hopkins | 126/440 |
| 4,196,719 | 4/1980 | Skrivseth | 126/400 |
| 4,202,493 | 5/1980 | Franchina | 237/2 B |

FOREIGN PATENT DOCUMENTS 2374 12/1979 European Pat. Off. ............ 126/440

*Primary Examiner*—Albert J. Makay
*Assistant Examiner*—Henry Bennett
*Attorney, Agent, or Firm*—Basile, Weintraub & Hanlon

[57] ABSTRACT

A heating system for a building having solar panels for collecting solar heat including sunlight concentrating lenses and a heat storage chamber for storing excess solar heat is disclosed. A heat pump is provided to supplement the solar heat when the temperature in the heat storage chamber is below a comfortable level. During heat pump operation, solar warmed air is pumped from the heat storage chamber to a chamber surrounding a heat pump evaporator to raise the evaporator ambient temperature and provide more efficient heat pump operation.

6 Claims, 3 Drawing Figures

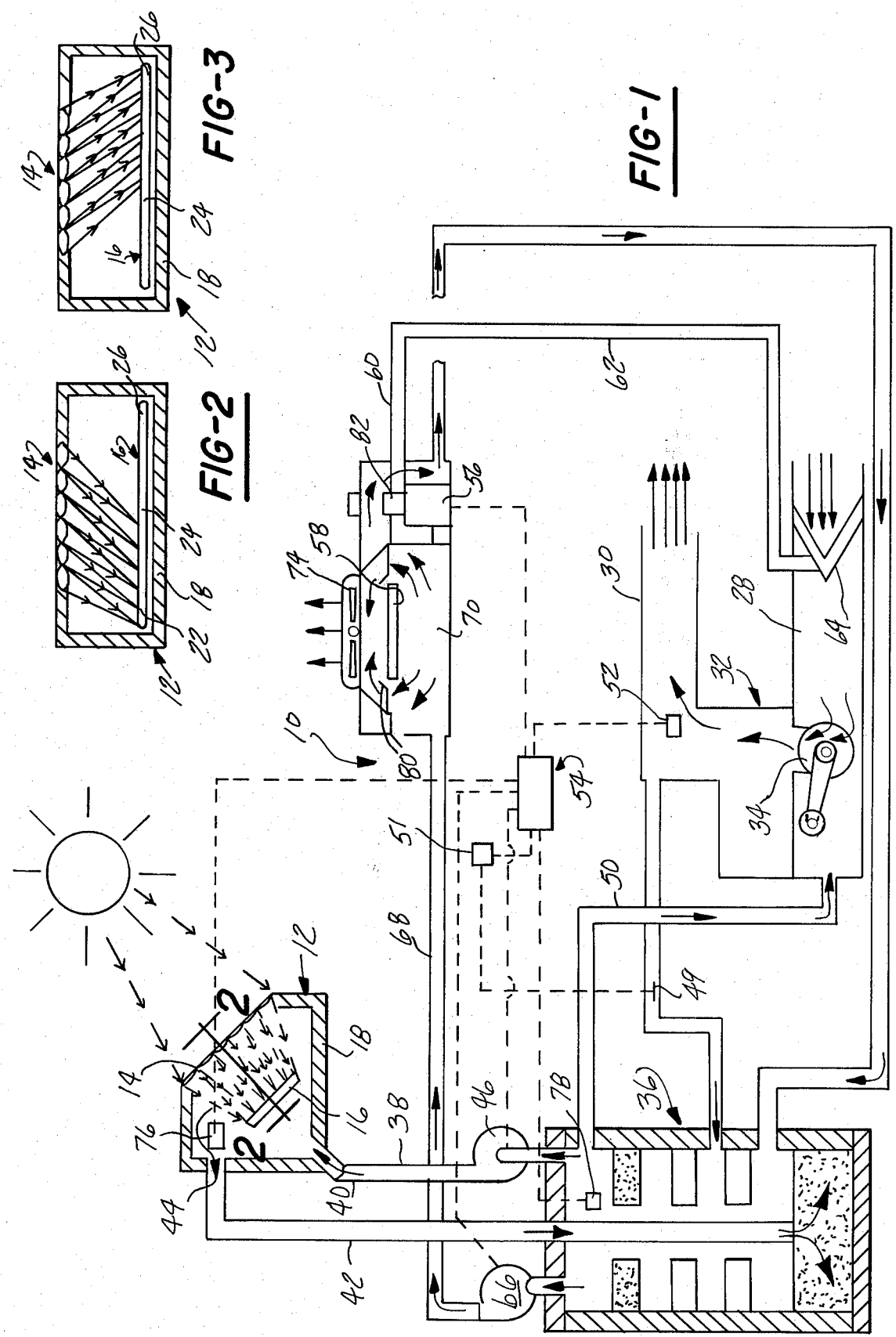

HEATING SYSTEM WITH FOCUSED SOLAR PANELS AND HEAT PUMP ASSIST

BACKGROUND OF THE INVENTION

I. Field of the Invention

The present invention relates generally to heating devices and, in particular the present invention is concerned with heating systems with lens focused solar panels for concentrating sunlight on the solar collectors. A heat pump is included for supplementing the solar heat when the solar warmed air drops below a comfortable temperature.

II. Cross Reference to Related Application

This application relates to an earlier filed application Ser. No. 968,437 filed Dec. 11, 1978 entitled "HEAT PUMP WITH SUPPLEMENTAL SOLAR HEAT" now U.S. Pat. No. 4,202,493.

III. Description of the Prior Art

In recent years there has been a deep concern by the public for the high cost of energy and, in particular, the cost of providing heat to homes, office buildings, and the like. A variety of methods have been proposed for drawing heat from the atmosphere, and heat pump cooling and air conditioning systems have been suggested as a solution. Solar heating has also been proposed as a solution, but neither heat pump reversing or conversion systems nor solar heating have met with full acceptance of the public in that they merely offer a different manner of heating rather than fulfilling their potential as a different heat source to be combined with heat generating systems of different types. Examples of heat pump conversion systems in the prior art are disclosed in U.S. Pat. Nos. 3,993,121; 3,996,998; 3,935,899; 3,777,508; 2,677,243; 3,844,233; and 4,050,628 and 4,202,493. These patents are relevant to applicant's invention in that they represent the closest prior art for utilizing heat pumps in conjunction with furnace systems to maximize the efficiency of obtaining heat for homes, office buildings and the like.

U.S. Pat. Nos. 4,069,593; 4,112,920; 4,112,919; 4,132,221; 4,138,061; and 4,154,292 disclose various devices for utilizing solar energy for dwelling or bath water heating.

None of the above listed United States patents include the use of focused solar energy as disclosed in the present invention. None of the above listed United States patents disclose the use of focused solar energy in combination with a heat pump as disclosed in the present invention.

IV. Prior Art Statement

The aforementioned Prior Art including the Applicant's Cross Referenced Application, in the opinion of the Applicant's Attorney represent the closest prior art of which the Applicant and his Attorney are aware.

SUMMARY OF THE INVENTION

The present invention, which will be described in greater detail subsequently, comprises a heating system for heating homes and office buildings, and the like comprising a solar panel which warms air contained therein. The solar warmed air is circulated to an air circulator which replaces a conventional furnace. The solar warmed air warms the air within the air circulator which transmits the warmed air to various parts of the building. The solar panel further comprises a plurality of lenses interposed between the sun and a solar energy collector which lenses concentrate and increase the heat from the sun. The solar heater further comprises a heat storage chamber containing heat absorbing materials that absorb heat during periods when there is an excess of solar heat available and give up there heat during periods when their is less solar heat available than needed. A heat pump is employed to augment the solar warmed air during periods when the air contained in the storage chamber drops below a level suitable for comfort. When the heat pump is in operation, air from the heat storage chamber is circulated around an evaporator associated with the heat pump to raise the ambient temperature of the evaporator and improve the efficiency of the heat pump thereby.

It is therefore a primary object of the present invention to provide a new and improved heating system.

It is a further object of the present invention to provide such a heating system which combines a solar heater and a heat pump to provide an efficient system for heating and cooling the air within a building.

It is yet another object of the present invention to provide a solar panel that employs lenses to concentrate the sun's solar energy to raise the temperature at the solar panel collector to improve the solar panel efficiency.

It is a further object of the present invention to provide a heat storage chamber to store solar heat during periods when there is more solar energy available than needed and to give up the stored solar heat during periods of low solar heat availability.

It is also an object of this invention to provide solar warmed air to raise the ambient temperature at the heat pump evaporator to improve the heat pump efficiency.

It is another object of the present invention to provide a heating system comprising a solar heater and a heat pump wherein the heat pump reversably functions to heat and cool the supply of air delivered to the heating system.

It is yet a further object of the present invention to provide a combination heating system having a solar heater and heat pump arrangement which results in substantial fuel savings as compared with conventional heating systems.

It is yet another object of the present invention to provide an improved heating system which may be readily and inexpensively installed.

Further objects, advantages, and applications of the present invention will become apparent to those skilled in the art of heating systems when the accompanying description of one example of the best mode contemplated for practicing the invention is read in conjunction with the accompanying drawing.

BRIEF DESCRIPTION OF THE DRAWING

In the drawing, like reference numbers refer to like parts throughout the several views, and wherein:

FIG. 1 is a schematic diagram of the heating system constructed in accordance with the principles of the present invention;

FIG. 2 illustrates a cross sectional view of the solar heater taken along the lines 2—2 of FIG. 1 with the sun in the East and FIG. 3 illustrates the cross sectional view of the solar heater of FIG. 2 with the sun in the West.

DESCRIPTION OF THE PREFERRED EMBODIMENT

Referring now to the drawing and in particular FIG. 1 wherein there is illustrated one example of the present invention in the form of a heating system 10. The system 10 is adapted to provide heat to a building and includes a solar heater 12 which includes a plurality of lenses 14 for concentrating and focusing solar energy on a collector 16 which is configured to absorb heat from the concentrated solar rays. The plurality of lenses 14 and the collector 16 are supported by an insulated enclosure 18 which mounts the plurality of lenses oriented in a direction to best absorb the sun's rays and positions the collector to best absorb the concentrated rays from the plurality of lenses 14. The enclosure 18 contains solar warmed air which is warmed by heat radiating from the collector 16.

The collector 16 of the solar heater 12 is substantially longer than the plurality of lenses 14. The plurality of lenses 14 and the collector 16 are aligned so that, in the morning, the solar energy passing through the lenses is concentrated and directed to a first portion of the collector 22, as shown in FIG. 2. At noon the solar energy is concentrated on a second or central portion of the collector 24, and in the afternoon the solar energy is concentrated on a third portion of the collector as shown in FIG. 3 26. This alignment of the collector enables the solar heater to efficiently concentrate the sun's rays throughout the day without the expense and energy cost of rotating the solar heater in the direction of the sun.

The heating system 10 further comprises an air return or inlet duct 28, a conditioned air duct 30, and an air or outlet circulator 32 which includes a first fan 34. The fan 34 is employed to move air from said inlet duct 28 to said outlet duct 30 wherein the air pressure in said outlet duct 30 is above the air pressure in said inlet duct 28. Means are provided for utilizing heat from the solar collector 12 to warm the air passing through the air circulator as will be described subsequently.

The means for utilizing heat from the solar collector to warm air passing through the air circulator 32 comprises a heat storage chamber 36 which receives solar warmed air from the solar collector 12 and contains pumice, eutectic salts and/or rocks which absorb the heat from the solar warmed air when being heated and give up their heat to the surrounding air when being cooled. A first conduit 38 interconnects the storage chamber 36 and a solar collector inlet 40, and a second conduit 42 interconnects a solar collector outlet 44 and the heat storage chamber 36. A second fan 46 in the first conduit 38 transmits air from the heat storage chamber 36 to the solar collector and from the solar collector 12 through the second conduit 42 to the storage chamber 36. As the air passes from the solar collector inlet 40 to the solar collector outlet 44 it is warmed by absorbing heat from the collector 16.

A third conduit 48 interconnects the conditioned air duct 30 and the heat storage chamber 36. The higher pressure within the duct 30 forces air to circulate from the duct 30 to the storage chamber 36. A damper 49 responsive to a room temperature thermostat 51 controls the flow of air from the conduit 48 to the heat storage chamber 36. A fourth conduit 50 conducts solar warmed air from the heat storage chamber 36 to the return air duct 28 warming said return air.

The heat storage chamber 36 is sized to absorb heat by means of eutectic salts and/or rocks contained therein on days when there is a surplus of solar energy. At night and during periods of prolonged cloudiness, the heat storage chamber 36 gives up its heat to the air passing therethrough to maintain a suitable temperature level in the building. Should an excess or prolonged demand for heat reduce the temperature of the air within the heat storage chamber 36 to a point where the temperature within the conditioned air duct 30 is sufficiently low to cause discomfort within the building, a first temperature sensor 52 signals a controller 54 which starts a heat pump compressor 56. The heat pump compressor 56 draws fluid from a heat pump evaporator 58 which absorbs heat from its ambient surroundings. A fluid which has absorbed the heat from the evaporator is compressed by the compressor 56 and transmitted by a line 60 to a condenser 64 disposed in the return air duct where the fluid gives up its heat to the air passing therethrough. The fluid returns to the heat pump compressor 56 by means of a second line 62 extending between the compressor and the condenser.

When the controller 54 starts the heat pump compressor 56 in operation, the controller also starts in motion a third fan 66 placed in a fifth conduit 68 which innerconnects the heat storage chamber 36 and a chamber 70 enclosing the evaporator 58. The fifth conduit 68 transmits warm air from the heat storage chamber 36 to the chamber 70 raising the ambient temperature at the evaporator 58 and increasing its efficiency and the amount of energy the evaporator can absorb. A sixth conduit 72 innerconnects the chamber 70 and the heat storage chamber 36 to return the air to the heat storage chamber after it has given up its heat to the evaporator 58. A fourth fan 74 circulates air past the evaporator 58 when the heat pump 56 is operating in an air cooling mode as will be described subsequently.

A second temperature sensor 76 within the solar heater 12 and a third temperature sensor 78 within the heat storage chamber 36 are interconnected to the controller 54, with the controller 54 being programmed to activate the second fan 46 when the temperature in the solar heater 12 exceeds the temperature at the heat storage chamber 36, and to turn off the second fan 46 when the temperature in the heat storage chamber 36 exceeds the temperature in the solar heater 12 as occurs when there is no sunlight such at night.

The controller 54 is a commercially available item Model No. T-603A-1029-1 available from the Minneapolis Honeywell Corporation, Minneapolis, MN. Alternatively, the various temperature sensors can be set to respond to a preset temperature for activating the various elements they control.

The heat pump, it should be noted works in a conventional manner in the summertime to provide cooling for the building. In the cooling mode baffles 80 open so that the fan 74 circulate outside air past the evaporator 58 and a valve 82 functions to direct the flow of fluid in a reverse manner between the evaporator 58 and the condenser 64. In this mode the condenser functions as an evaporator and the evaporator functions as a condenser, thereby drawing heat from air passing by the condenser 58, which heat is exhausted into the atmosphere.

It can thus be seen that the present invention has provided a new and improved system for heating buildings utilizing solar panels and the like wherein a heat pump is used in combination with the solar panel in such a manner that the system is very economical in that it utilizes focused solar warmed air to improve the heat pump efficiency even when the solar warmed air is below a temperature for room comfort.

It should be understood by the skilled artisan that the lenses of the present invention may be employed in conjunction with conventional solar panels by placing the lenses between the solar panel and the sun.

It should be understood by those skilled in the art of heating systems that other forms of the Applicant's invention may be had, all coming within the spirit of the invention and the scope of the appended claims.

Having thus described my invention what I claim is:

1. A stationary solar heater for utilizing sunlight to heat a solar energy collector of the type wherein a fluid is circulated past the collector to absorb heat therefrom and translated to a device for utilizing the heat contained within the fluid, the improvement comprising:
    a plurality of lenses interposed between the collector and the sun; said lenses concentrating the solar energy on the collector;
    the collector having a length substantially longer than the length of the plurality of lenses, and wherein the plurality of lenses and the collector are aligned so that in the morning the entire amount of solar energy striking the lenses is concentrated directly on a first portion of said collector, at noon the entire amount of solar energy striking the lenses is concentrated directly on a second or central portion of the collector, and in the afternoon the entire amount of solar energy striking the lenses is concentrated directly on a third portion of the collector; said solar heater further comprising a heating system device for a building comprising:
    a conditioned air duct for passing conditioned air;
    an air return for passing return air;
    an air circulator having an inlet communicating with said air return, an outlet communicating with said conditioned air duct, and a first fan for moving air from said inlet to said outlet wherein the air pressure in said outlet is above the air pressure in said inlet;
    means for utilizing heat from the solar collector to warm air passing through said air circulator;
    a heat pump comprising a condenser disposed within said air return, said condenser heating air passing thereby from said air return, said heat pump having an evaporator located externally of said building for drawing heat from air passing thereby;
    a first temperature sensor in the conditioned air duct for turning on the heat pump at a preset temperature;
    a fan for passing air by said evaporator;
    a conduit communicating the means for utilizing heat from the solar collector with a first chamber surrounding the evaporator so that solar warmed air may be drawn from the means for utilizing heat to increase the ambient temperature of the air surrounding the evaporator, a conduit communicating the first chamber with the means for utilizing heat to return air from the first chamber to the means for utilizing heat when said air has given up its heat;
    a fan means within the conduit for translating solar warmed air to the first chamber and from the first chamber to the means for utilizing heat;
    said means for utilizing heat from the solar collector to warm air passing through said air circulator comprising:
    a heat storage chamber;
    a first conduit interconnecting the storage chamber and a solar collector inlet;
    a second conduit interconnecting a solar collector outlet and the heat storage chamber;
    a second fan in the first conduit for translating air from the heat storage chamber to the solar collector and from the solar collector through the second conduit to the heat storage chamber translating solar warmed air to the heat storage chamber;
    a third conduit interconnecting the heat storage chamber and the conditioned air duct, a fourth conduit interconnecting the heat storage chamber and the air return duct wherein air flows from the solar collector outlet to the heat storage and from the heat storage chamber to the inlet warming air passing through the air circulator.

2. The device of claim 1 further comprising a means for storing heat within the heat storage chamber.

3. The device of claim 1 further comprising a damper within the third conduit to selectively vary the flow of air between the solar collector outlet and the heat storage chamber, said damper responsive to a room thermostat setting within the building.

4. A solar heater for utilizing sunlight to heat a solar energy collector of the type wherein a fluid is circulated past the collector to absorb heat therefrom and translated to a device for utilizing the heat contained within the fluid, the improvement comprising:
    a plurality of lenses interposed between the collector and the sun;
    said lenses concentrating the solar energy on the collector;
    a heating system device for a building comprising:
    a conditioned air duct for passing conditioned air;
    an air return for passing return air;
    an air circulator having an inlet communicating with said conditioned air duct, and a first fan for moving air from said inlet to said outlet wherein the air pressure in said outlet is above the air pressure in said inlet; and
    means for utilizing heat from the solar collector to warm air passing through said air circulator;
    the means for utilizing heat from the solar collector to warm air passing through said air circulator comprising:
    a heat storage chamber;
    a first conduit interconnecting the storage chamber and a solar collector inlet;
    a second conduit interconnecting a solar collector outlet and the heat storage chamber;
    a second fan in the first conduit for translating air from the heat storage chamber to the solar collector and from the solar collector through the second conduit to the heat storage chamber translating solar warmed air to the heat storage chamber; and
    a third conduit interconnecting the heat storage chamber and the conditioned air duct, a fourth conduit interconnecting the heat storage chamber and the air return duct wherein air flows from the outlet to the heat storage chamber and from the heat storage chamber to the inlet warming air passing through the air circulator;
    a heat pump comprising a condenser disposed within said air return, said condenser heating air passing thereby from said air return, said heat pump having an evaporator located externally of said building for drawing heat from air passing thereby;

a first temperature sensor in the conditioned air duct for turning on the heat pump at a preset temperature;

a fan for passing air by said evaporator;

a fifth conduit communicating the heat storage chamber with a first chamber surrounding the evaporator so that solar warmed air may be drawn from the heat storage chamber to warm the air surrounding the evaporator, a sixth conduit communicating the first chamber with the heat storage chamber to return air from the first chamber to the heat storage chamber when said air has given up its heat; and a third fan means within the fifth conduit for translating solar warmed air to the first chamber and from the first chamber to the heat storage chamber.

5. The device of claim 1 further comprising:

a second temperature sensor within the solar collector, a third temperature sensor within the heat storage chamber, a controller interconnected to the second and third temperature sensors, said controller programmed to activate the second fan when the temperature at the solar collector exceeds the temperature at the heat storage chamber, and to turn off the second fan when the temperature at the heat storage chamber exceeds the temperature at the solar collector.

6. The device of claim 1 further comprising the first temperature sensor within the conditioned air duct in communication with the controller, the controller programmed so that when the conditioned air temperature is below a preset level and the room thermostat is calling for heat in the building, the heat pump is turned on and the third fan circulates air from the heat storage chamber to the first chamber.

* * * * *